United States Patent [19]

Mudge

[11] E Patent Number: Re. 32,828

[45] Reissued Date of Patent: Jan. 10, 1989

[54] PASSIVE INFRARED INTRUSION DETECTION SYSTEM

[75] Inventor: Philip H. Mudge, New Fairfield, Conn.

[73] Assignee: Cerberus A.G., Switzerland

[21] Appl. No.: 502,649

[22] Filed: Jun. 9, 1983

Related U.S. Patent Documents

Reissue of:

[64] Patent No.: 4,275,303
Issued: Jun. 23, 1981
Appl. No.: 93,443
Filed: Nov. 13, 1979

[51] Int. Cl.[4] ..... G01J 1/00

[52] U.S. Cl. ..... 250/342; 250/353

[58] Field of Search ..... 250/221, 234, 330, 340, 250/341, 342, 353; 340/567; 378/206

[56] References Cited

U.S. PATENT DOCUMENTS

| | | | |
|---|---|---|---|
| 2,198,725 | 4/1940 | Smith . | |
| 2,955,205 | 10/1960 | Camfferman | 378/206 |
| 3,509,344 | 4/1970 | Bouwers | 250/333 |
| 3,535,539 | 10/1970 | Malespina . | |
| 3,551,683 | 12/1970 | Tothill | 250/221 |
| 3,594,578 | 7/1971 | Ohman | 250/234 |
| 3,631,434 | 12/1971 | Schwartz | 250/221 |
| 3,668,674 | 6/1972 | Westendorf | 250/218 |
| 3,703,718 | 11/1972 | Berman . | |
| 3,752,978 | 8/1973 | Kahl et al. | 250/340 |
| 3,760,397 | 9/1973 | Taggart | 250/221 |
| 3,760,399 | 9/1973 | Schwarz | 250/221 |
| 3,803,572 | 4/1974 | Campman | 250/221 |
| 3,815,112 | 6/1974 | Kleber . | |
| 3,839,640 | 10/1974 | Rossin | 250/342 |
| 3,859,648 | 1/1975 | Corbin | 250/221 |
| 3,924,253 | 12/1975 | Marino . | |
| 3,928,843 | 12/1975 | Sprout et al. | 250/371 |
| 3,928,849 | 12/1975 | Schwarz . | |
| 3,958,118 | 5/1976 | Schwarz . | |
| 3,970,846 | 7/1976 | Schofield et al. . | |
| 4,011,554 | 3/1977 | Butler . | |
| 4,052,616 | 10/1977 | Keller | 250/342 |
| 4,058,726 | 11/1977 | Paschedag et al. | 250/338 |
| 4,081,678 | 3/1978 | Macall | 250/330 |
| 4,081,680 | 3/1978 | Keller | 250/342 |
| 4,087,688 | 5/1978 | Keller | 250/342 |
| 4,087,689 | 5/1978 | Asawa | 250/342 |
| 4,141,006 | 2/1979 | Braxton . | |
| 4,179,691 | 12/1979 | Keller | 250/221 |
| 4,317,998 | 3/1982 | Dore | 250/342 |
| 4,346,293 | 8/1982 | Fetzer | 250/221 |

FOREIGN PATENT DOCUMENTS

| | | |
|---|---|---|
| 1262833 | 3/1968 | Fed. Rep. of Germany . |
| 1547451 | 11/1969 | Fed. Rep. of Germany . |
| 7515814 | 9/1975 | Fed. Rep. of Germany . |
| 2836462 | 3/1980 | Fed. Rep. of Germany . |

OTHER PUBLICATIONS

Projektierung und Installation, Jun. 1977, Heft 1.
Inbertriebsetzung und Unterhalt, Sep., 1977, Heft 2.
"Infrared Heat Radiation: A New Principle of Intruder Detection", in *Cerberus*, Apr. 1976, publication of Cerberus A.G., Mannedorf/Switzerland.
Cerberus data sheet, Dec. 1978, Typ IR21, No. Ye3/294 719/1(1) p. 9.

*Primary Examiner*—Janice A. Howell
*Attorney, Agent, or Firm*—Brumbaugh, Graves, Donohue & Raymond

[57] ABSTRACT

The invention comprises a passive infrared intrusion detector including a lamp for locating the zones being protected by the detector. The detector includes a heat sensor, a lens system for receiving and focusing the body heat of an intruder on the heat sensor, and electrical circuitry responsive to the heat sensor for actuating an alarm or detection signal when the body heat of an intruder is detected.

The zone locator lamp is positioned near the heat sensor and its light passes through a lens in the general direction of a zone to be protected. The light parallels a portion of radiation which is focused on the heat sensor by another lens. If the light can be observed from a given position in front of the detector, that position is in a zone being observed by the detector and body heat radiated from that zone will be focused on the heat sensor. Thus, zones protected by the intrusion detector can be established by adjusting the position of the detector until light from the zone locator lamp is observed. Once these zones are established, the lamp may be disconnected and the intrusion detector placed in the "ready" or "stand by" mode.

24 Claims, 2 Drawing Sheets

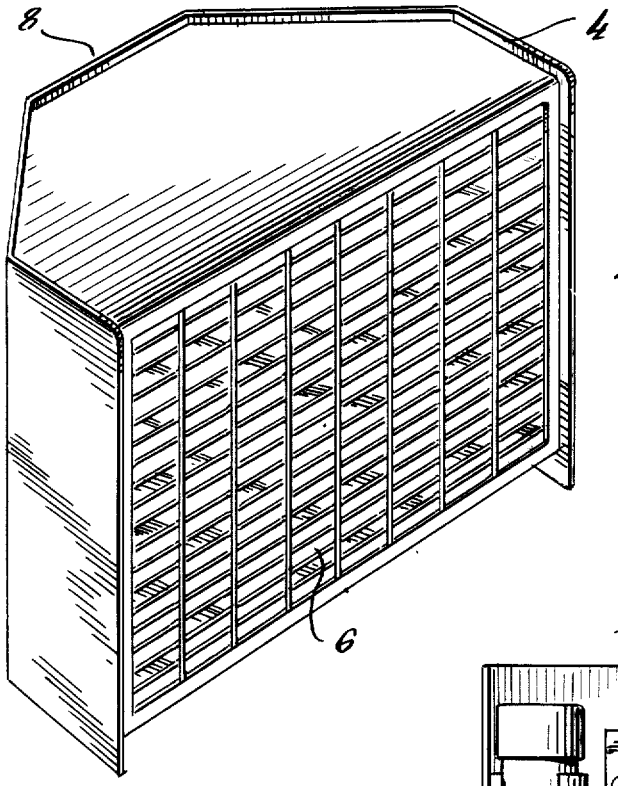
Fig. 1.
Fig. 2.
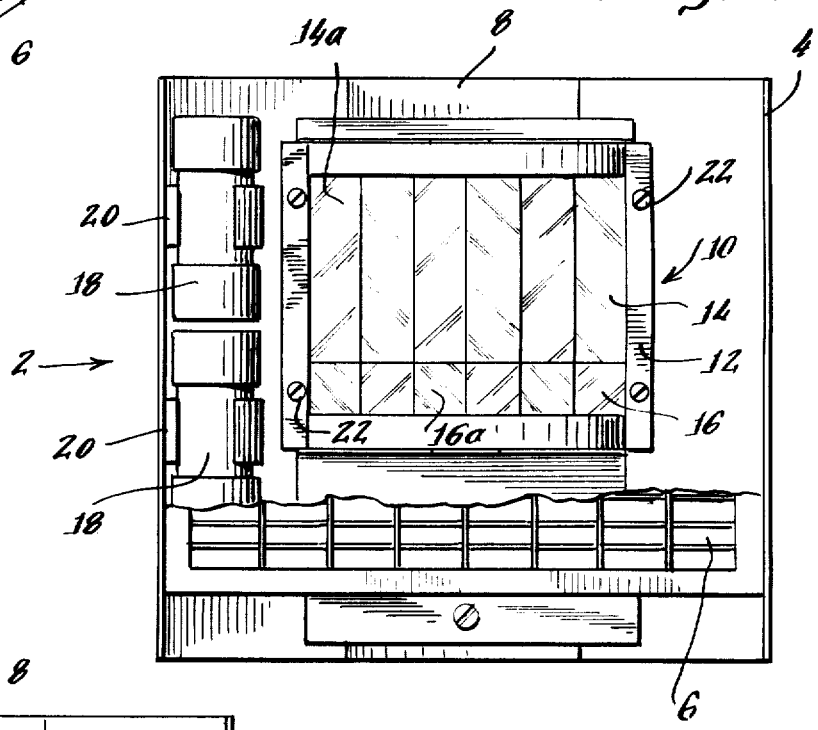
Fig. 3.
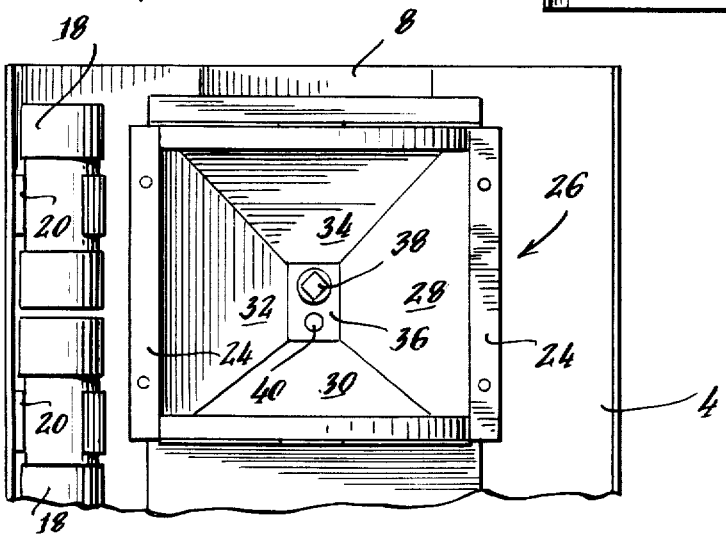

PASSIVE INFRARED INTRUSION DETECTION SYSTEM

Matter enclosed in heavy brackets [ ] appears in the original patent but forms no part of this reissue specification; matter printed in italics indicates the additions made by reissue.

BACKGROUND OF THE INVENTION

The present invention relates to a passive infrared intrusion detector. This type of detector includes a heat sensor, a lens for focusing heat energy on the heat sensor, and means operatively associated with the heat sensor for providing a detection signal when the heat sensor detects a sudden change of temperature, as for example, caused by the body heat of a passing intruder. One common example of a type of passive infrared intrusion detector incorporates a pyroelectric detector as the heat sensor.

One problem with known passive infrared intrusion detectors is that it is difficult to establish specific zones to be observed and protected by the detector before the detector is put into operation. It is imperative that the zones to be protected be directed away from any potential source of false alarms. Any surface or object which can change temperature rather rapidly is a source of false alarms. These sources include grills on heater ducts, light bulbs, air conditioners, and the like.

In the past, trial and error techniques have been used to focus infrared intrusion detectors away from sources of false alarms. For example, a source of heat (as for example a human body) was moved about in the zone desired to be protected while the intrusion detector was adjusted. The generation of an alarm signal indicated that the intrusion detector was focused on the desired zone to be protected. Such trial and error techniques were obviously time consuming and cumbersome.

It is an object of the present invention to provide a method and apparatus which utilizes a lamp which emits visible light to locate and establish zones to be protected by the detector before the intrusion detector is put into operation.

SUMMARY OF THE INVENTION

The present invention provides an improved passive infrared intrusion detector and a method of locating and establishing zones to be protected before the alarm is placed in operation. The intrusion detector is of the type including a heat sensor, a lens positioned to focus heat on the heat sensor, and means operatively associated with the heat sensor for actuating a detection signal or alarm in response to a sudden change of temperature detected by the heat sensor. Such sudden change in temperature can be caused by heat radiated from the body of a passing intruder.

A lamp which emits visible light is positioned within the detector near the heat sensor. Light from the lamp passes through the lens in the general direction of the zones to be protected by the detector. The light from the lamp parallels the portion of heat radiated from the zone to be protected which will be focused on the heat sensor. The detector is adjusted until an observer in front of the lens can see the light from the lamp. The observer is then standing in a zone which is being observed by the detector. Accordingly, at least a portion of the body heat radiated from a person in that zone will impinge upon the lens and be focused on the heat sensor. Thus, when the detector is in its operational mode, an intruder passing through the established zone of protection will actuate the detector which will generate a detection or alarm signal.

BRIEF DESCRIPTION OF THE DRAWINGS

FIG. 1 is a perspective view of the new passive infrared intrusion detector with a cover mounted thereon.

FIG. 2 is a front elevational view of the intrusion detector with its cover partially broken away to show its lens and power supply unit. The details of the electronic circuitry have been omitted.

FIG. 3 is the intrusion detector of FIG. 2 with the lens removed to show a heat sensor and a zone locator lamp positioned behind the lens.

DETAILED DESCRIPTION OF THE DRAWINGS

Figure 4:
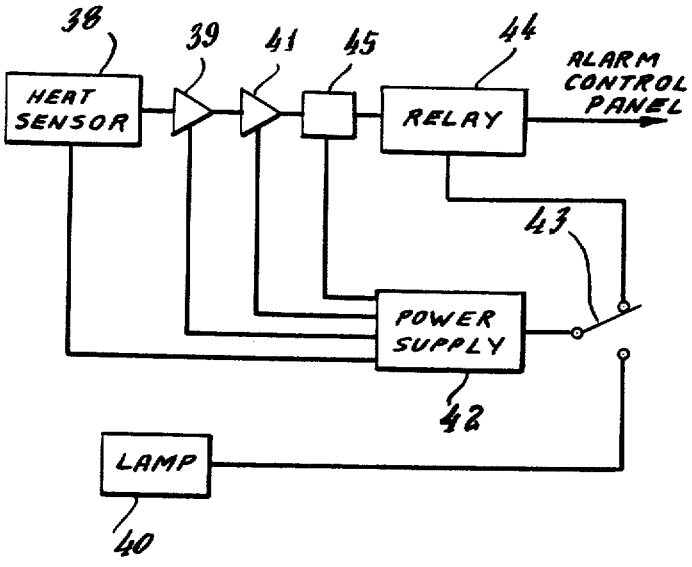
FIG. 4 is a block diagram of the electronic circuitry used in one type of passive infrared intrusion detector.
Figure 5:
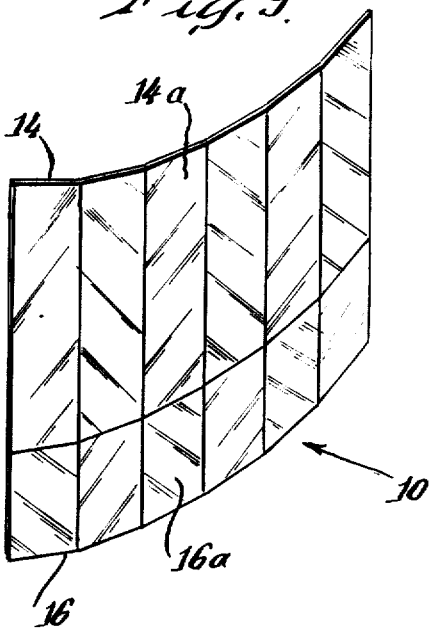
FIG. 5 is a perspective view of a lens used in connection with the intrusion detector.

FIGS 1 through 6 of the drawings illustrate a preferred embodiment of an improved passive infrared intrusion detector. Such detectors are generally known to the art and include a heat sensor, a lens for focusing heat on the heat sensor, and means responsive to the heat sensor for generating a detection or alarm signal when the heat sensor senses a sudden change in temperature, such as a change caused by the body heat of a passing intruder.

A common type of passive infrared intrusion detector well-known to the art incorporates a pyroelectric heat sensor. Briefly stated, such as an alarm includes a pyroelectric element (as for example the Pyroelectric IR Detector Model 406, sold by Eltec Instruments, Inc.) which generates an electric current proportional to the rate of change of temperature detected.

It should be noted that although the apparatus and method disclosed herein employ pyroelectric heat sensors, they are also applicable to passive infrared intrusion systems using other types of heat sensors. Accordingly, although pyroelectric intrusion detectors will be referred to in the description herein, this is intended to be illustrative only and not restrictive of the users of the disclosed improved detection system.

FIG. 1 of the drawings illustrates a passive infrared intrusion detector 2 as it would appear when mounted. The detector includes a housing 4 having a grill 6 removably mounted to the front of the housing. The housing is tapered towards its rear wall 8. Means (not shown) are provided on the rear wall of the housing for mounting purposes. For example, the rear wall 8 can be mounted to a wall so that the grill 6 will face an area to be protected by the detector.

FIG. 2 is a front view of the detector of FIG. 1 with the grill 6 removed. A Fresnel lens 10, which is positioned behind the grill 6, has a border 12 which is mounted to a frame 24 (shown in FIG. 3). The lens includes an upper section 14 which is also referred to as the far field lens, and a lower section 16, which is also referred to as the near field lens. Both the upper and lower lens sections are subdivided into a plurality of panels 14a and 16a, respectively, as is more clearly shown in FIG. 5. Also, both the upper and lower lens sections can be collimating lenses. The lens border 12 is mounted to the frame 24 by screws 22. Batteries 18 are held in position to one side of the lens 10 by clamps 20 mounted within the housing.

FIG. 3 is a front view of the intrusion detector of FIGS. 1 and 2 with the lens 10 removed from the frame 24. As is clear from this drawing, frame 24 forms the border of the open front of a pyramidal inner housing 26 which is positioned within the larger housing 4.

The sidewalls 28, 30, 32 and 34 of the inner housing 26 converge rearwardly on a rear wall 36. This rear wall is mounted to the front surface of rear wall 8 of the larger housing 4, and means are provided for pivotally mounting the inner housing 26 to the rear wall 36. Accordingly, the lens 10 is movable relative to the rear wall 36 of the inner housing 26.

A heat sensor 38 and a lamp 40 for emitting visible light are mounted to the front surface of the rear wall 36. Both the heat sensor and the lamp are positioned so they are facing towards the front of the larger housing 4. The lamp 40 is positioned near the heat sensor 38. Both the heat sensor and the lamp are located behind lens 10 when the lens is mounted to the inner housing 26.

In the preferred embodiment of the invention, the lamp 40 is a light emitting diode (LED) and means are provided to selectively electrically actuate the LED. However, as will become apparent, any source capable of emitting visible light can be used as the lamp 40. As will also be discussed in detail below, the lamp 40 enables the user of the intrusion detector to locate and establish the protection zones to be observed by the detector before the detector is actually placed in operation.

FIG. 4 is a very simple block diagram of the electrical circuitry of the passive intrusion detector. The heat sensor 38 can be, for example, a pyroelectric element such as the previously mentioned Eltec Model 406. Other types of heat sensors, which are known to the art, can also be used. Examples of specific electronic circuitry for passive infrared intrusion alarms are illustrated in U.S. Pat. Nos. 3,928,843; 3,839,640; and 3,703,718.

In the diagram of FIG. 4, a power supply 42 can be electrically coupled by the switch 43 to either the relay 44 or the lamp 40. When the power supply is coupled to the lamp 40, no power is provided to the relay which will cause the relay to deenergize or, in effect, go into the alarm mode and transmit a detection signal to an alarm control panel. The alarm control panel includes switch means for inhibiting the generation of a signal to an associated alarm (not shown). Accordingly, the lamp 40 can be actuated and used to adjust the intrusion detector, as will be described below, without causing an actual alarm signal during the adjustment operation. Once the intrusion detector is adjusted, and the cover replaced, switch 43 is moved so that the lamp will be turned off and power will be provided to the relay 44. The relay becomes energized as it is now receiving power from the power supply 42.

Heat sensor 38 is electronically coupled to the relay 44 through amplifiers 38, 41 and signal comparator 45. When an intruder is detected by the heat sensor, the relay 44 is deactivated by the heat sensor and sends a detection signal to the alarm control panel. As noted before, the alarm control panel includes means for inhibiting the alarm signal even though a detection signal is provided by the relay. This feature is useful during adjustment of the detector as mentioned above, and when it is not desired to generate an intrusion alarm signal as, for example, during business hours when the detector is mounted in business premises. Neither the alarm control panel nor the alarm form part of the intrusion detector. The intrusion detector may also include a tamper switch which will deenergize relay 44 if the grill 6 is removed from the intrusion detector.

Figure 6:
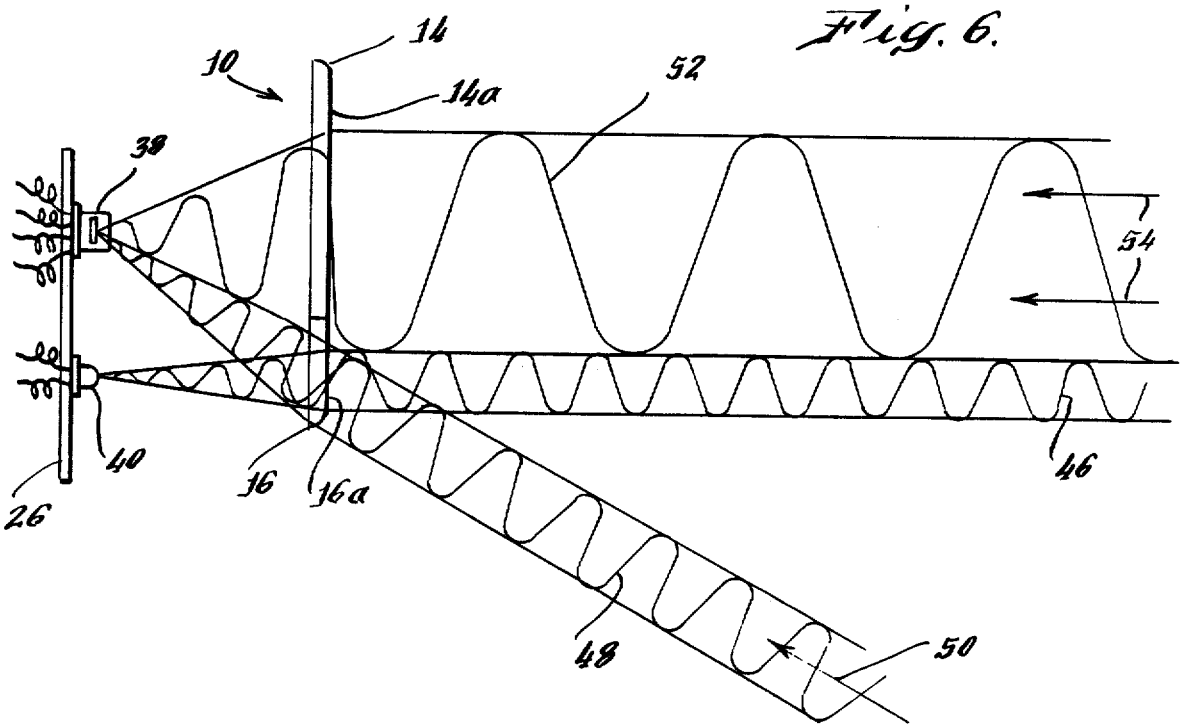
FIG. 6 is a schematic view of the intrusion detector showing light emitted from the zone locator lamp travelling through the lens and heat radiation from zones to be protected impinging upon the lens and being focused on a heat sensor.

Operation of the disclosed intrusion detector will now be discussed with reference to FIG. 6 of the drawings which is a schematic diagram of the effect of a single upper lens panel 14a and a single lower lens panel 16a on light and infrared radiation, in accordance with the present invention.

The intrusion detector may be mounted on the wall of premises to be protected. After this is done, with the cover still removed, the lamp 40 is electrically actuated by switch 43 which connects the lamp to the power supply. As discussed above, although relay 44 will provide a detection signal when the switch is in this position, the alarm control panel prevents the generation of an alarm signal during the adjustment of the detector. The light emitted from the lamp, illustrated by waveform 46, is transmitted through the lower lens panel 16a and into the general zone to be protected by the detector.

Lens 10 includes a far field lens panel 14a (the upper lens) and a near field lens panel 16a (the lower lens). In FIG. 6, waveform 48 illustrates the portion of heat radiating from a body in a near field (shown by arrow 50) which is focused on the heat sensor 38, while waveform 52 illustrates the portion of heat radiating from a body in a far field (shown by arrows 54) which is focused on the heat sensor 38. The heat radiated from the near field (waveform 48) strikes the near field panel 16a of lens 10 and is focused on the heat sensor 38, and the heat radiated from the far field (waveform 52) strikes the far field panel 14a of lens 10 and is focused on the heat sensor 38. Accordingly, the body heat of an intruder passing through either the near field or the far field will be detected by the heat sensor.

In addition to monitoring the near field, the lens panel 16a serves an alignment function. It does so with visible light (waveform 46) from the lamp 40. The lamp is positioned relative to the lower lens panel 16a and the heat sensor 38 so that in front of the lower lens panel 16a the collimated light (waveform 46) from the lamp 40 parallels the portion of the radiation (waveform 52) from the far field 54 which is focused on the heat sensor 38 by the upper lens panel 14a.

Light from the lamp 40 is used to locate and establish the zones protected by the intrusion detector before the intrusion detector is placed in operation. After the larger housing 4 has been mounted, an observer stands in a specific zone desired to be protected. The lamp 40 is turned on, and the inner housing 26 is adjusted until the observer sees the light from the lamp through lower lens panel 16a. Once the observer sees the light from the lamp, he is in a zone being observed by the detector. Accordingly, a portion of the body heat radiated from that position or zone will parallel the light emitted from the lamp back towards the lens, strike the upper lens panel 14a, and be focused on the heat sensor. All positions from which the light from the lamp can be seen are zones that are being observed and will be protected by the detector. Because both the near field and far field lenses are subdivided into an equal number of individual panels 14a and 16a, respectively (see FIG. 5), a corresponding number of zones to be protected by the intrusion detector can be located and established.

If it is determined that one of the zones includes an object that is a potential source of false alarms, the internal housing containing the lens segments can be repositioned slightly either horizontally or vertically to avoid the potential problem. Under some circumstances it may be more desirable to eliminate the zone that is viewing the potential source of false alarms. This can be accomplished by masking over the appropriate lens segment. (A piece of tape cut to size and appied only to the appropriate lens will accomplish this).

Once all desired zones of protection are located in the above manner, the grill 6 is mounted to the front of the housing 4, and the switch 43 now connects power to the relay 44, and removes it from lamp 40. Then, the alarm control panel is adjusted so that any detection signal which that panel receives from the relay will generate an alarm signal. The intrusion detector is now in its operational or "ready" mode, and any intrusion detected by the heat sensor will actuate the alarm.

The invention as described above employs a single lamp for establishing the position of the far field. It would also be within the scope of the invention to similarly employ a second lamp for establishing the position of the near zone via the far zone lens. In that case, the second lamp would be positioned relative to the far field lens and the heat sensor so that light from the second lamp passes through the far field lens and parallels the portion of radiation which is focused on the heat sensor by the near field lens.

The description of the invention provided herein is intended to be illustrative only and is not restrictive of the scope of the invention, that scope being defined by the following claims and all equivalents thereto.

What is claimed is:

1. In a passive infrared intrusion detector of the type including a heat sensor for detecting a change in temperature caused by a passing intruder, a lens mounted in front of said heat sensor for receiving infrared radiation from the body of said intruder and focusing said radiation on said heat sensor, and means coupled to said heat sensor for actuating a signal when said heat sensor detects said temperature change, the improvement comprising:

a lamp for emitting visible light positioned within said intrusion detector proximate to said heat sensor, said lens including a first lens segment positioned to receive infrared radiation from a first zone to be protected and focus a portion of said radiation on said heat sensor, and a second lens segment positioned to receive radiation from a second zone to be protected and focus a portion of said radiation on said heat sensor, said second lens segment being positioned relative to said lamp and said heat sensor such that light from said lamp passes through said second lens segment and parallels that portion of radiation from said first zone which is focused on said heat sensor by said first lens segment, wherein said first zone may be located by adjusting said intrusion detector so that light from said lamp is observed in said first zone.

2. An intrusion detector as claimed in claim 1 wherein the top edge of said second lens segment is integrally joined to the bottom edge of said first lens segment.

3. An intrusion detector as claimed in claim 1 wherein said first and second lens segments are subdivided into a number of corresponding sections, each having a different field of view.

4. An intrusion detector as claimed in claim 1 wherein said first and second lens segments are collimating lenses.

5. An intrusion detector as claimed in claim 1 including means operatively associated with said lamp for deenergizing said lamp after said first zone has been located.

6. An intrusion detector as claimed in claim 1 further including means for movably mounting said lens relative to said heat sensor and said lamp.

7. An intrusion detector as claimed in claim 1 wherein said lamp is a light emitting diode (LED).

8. A method of locating zones protected by a passive intrusion detector of the type including a sensor for detecting infrared radiation from the body of an intruder, a lens for focusing said radiation of said sensor, and means coupled to said sensor for actuating a signal when the body heat of an intruder is sensed, comprising:

providing a first lens segment for receiving infrared radiation from a first zone to be protected and focusing a portion of said radiation on said sensor, providing a second lens segment for receiving infrared radiation from a second zone to be protected and focusing a portion of said radiation on said sensor, providing a lamp which emits visible light, positioning said lamp relative to said sensor and said second lens segment such that light emitted from said lamp passes through said second lens segment and parallels that portion of radiation from said first zone which is focused on the sensor by said first lens segment, selecting a first zone to be protected, and adjusting said intrusion detector so that light from said lamp is visible in said first zone through said second lens segment.

9. The method of claim 8 further including the step of:

deenergizing said lamp after said zone is located.

10. The method of claim 8 wherein said lamp is a light emitting diode (LED).

*11. In a passive infrared intrusion detector of the type including an infrared sensing element, responsive to infrared radiation emanating from within at least one zone comprising an angular region of space desired to be protected and including means coupled to said sensing element for actuating a signal in response to changes in said infrared radiation within said zone, the improvement comprising: a lamp for emitting visible light and means for focusing said visible light to be emitted from said infrared intrusion detector into said angular region of space, said light being emitted in a direction generally parallel to the direction of radiation from said zone to said sensing element such that the boundaries of said zone are defined by the location of said detector and the angular region of space in which said light is visually observable.*

*12. An intrusion detector according to claim 11 wherein said focusing means comprises a lens.*

*13. An intrusion detector according to claim 12 wherein said lens has a first lens segment for focusing infrared radiation emanating from said zone onto said sensing ele-*

*ment and a second lens segment for focusing light from said lamp into said zone.*

*14. An intrusion detector according to claim 13 wherein said second lens segment is arranged to focus infrared radiation from a second zone onto said sensing element.*

*15. An intrusion detector according to claim 13 wherein the top edge of said second lens segment is integrally joined to the bottom edge of said first lens segment.*

*16. An intrusion detector according to claim 13 wherein said first and second lens segments are subdivided into a number of corresponding sections, each having a different field of view.*

*17. An intrusion detector according to claim 12 wherein said lens is a collimating lens.*

*18. An intrusion detector according to claim 13 wherein said first and second lens segments are collimating lenses.*

*19. An intrusion detector according to claim 11 including means operatively associated with said lamp for selectively deenergizing said lamp.*

*20. An intrusion detector according to claim 12 further including means for moveably mounting said lens relative to said sensing element and said lamp.*

*21. An intrusion detector according to claim 13 further including means for moveably mounting said lens relative to said sensing element and said lamp.*

*22. An intrusion detector according to claim 11 wherein said lamp is a light emitting diode (LED).*

*23. A method of locating a first zone which comprises an angular region of space to be protected by a passive infrared intrusion detector of the type including an infrared sensing element arranged to receive infrared radiation emanating within said zone, and including means coupled to said sensing element for actuating a signal in response to changes in said infrared radiation within said zone comprising: providing said detector with a lamp arranged to emit visible light and means for focusing visible light from said lamp into said zone, said light being emitted in a direction generally parallel to the direction of radiation emanating from said zone to said sensing element; selecting a desired zone to be protected; and adjusting said detector so that light from said lamp is visually observable within said desired zone.*

*24. The method according to claim 23 wherein the lamp is deenergized after said step of adjusting.*

* * * * *

UNITED STATES PATENT AND TRADEMARK OFFICE

CERTIFICATE OF CORRECTION

PATENT NO. : Re. 32,828

DATED : Jan. 10, 1989

INVENTOR(S) : Philip H. Mudge

It is certified that error appears in the above-identified patent and that said Letters Patent is hereby corrected as shown below:

First page, before the first line of the second col., insert:

--4,188,533 2/1980 Ashenfelter et al. .... 250/341
4,275,303 6/1981 Mudge ..... 250/342--;

Col. 2, line 40, "as an" should read --an--;

Col. 8, following line 22, insert:

--25. An intrusion detector according to claim 11 wherein said lamp is mounted in a fixed position on said detector.

--26. An intrusion detector according to claim 11 wherein said lamp is arranged to emit said visible light into said angular region of space while said sensing element responds to infrared radiation emanating from said region of space.--.

Signed and Sealed this

Twenty-sixth Day of September, 1989

*Attest:*

DONALD J. QUIGG

*Attesting Officer*

*Commissioner of Patents and Trademarks*